United States Patent [19]

Krill et al.

[11] Patent Number: 5,046,016
[45] Date of Patent: Sep. 3, 1991

[54] COMPUTER AIDED DESIGN FOR $TE_{01}$ MODE CIRCULAR WAVEGUIDE

[75] Inventors: Jerry A. Krill, Ellicott City; Melrose M. Jesurun, Silver Spring; William H. Zinger, Columbia, all of Md.

[73] Assignee: The Johns Hopkins University, Balimore, Md.

[21] Appl. No.: 310,193

[22] Filed: Feb. 13, 1989

[51] Int. Cl.$^5$ .......................... G06F 15/60; H01P 3/16
[52] U.S. Cl. ..................................... 364/488; 333/157; 333/242
[58] Field of Search ................. 364/488, 489; 333/157, 333/218, 239, 242–248; 343/786

[56] References Cited

U.S. PATENT DOCUMENTS

| | | | |
|---|---|---|---|
| 4,338,609 | 7/1982 | Landry | 343/786 |
| 4,458,229 | 7/1984 | Landry et al. | 333/248 |
| 4,553,112 | 11/1985 | Saad et al. | 333/157 X |
| 4,636,757 | 1/1987 | Harrison et al. | 333/218 |
| 4,642,587 | 2/1987 | Riaziat | 333/125 |
| 4,800,350 | 1/1989 | Bridges et al. | 333/239 |

*Primary Examiner*—Felix D. Gruber
*Attorney, Agent, or Firm*—Robert E. Archibald

[57] ABSTRACT

A computer aided design (CAD) method for designing circular overmoded waveguide systems having optimal operating characteristics. The CAD method receives selected input waveguide operational, material and structural parameters and computes the resulting waveguide operational characteristics, including power losses for a given waveguide system configuration, including both straight and bent sections. Optimal designs for lined dielectric and sheathed-helix types of circular waveguide and waveguide bends have resulted for both S- and X-band operation.

10 Claims, 11 Drawing Sheets

Inputs

B (lined WG) or
A (helix WG)

$\delta$ $Re\{\epsilon_{re}\}$ $Im\{\epsilon_{re}\}$

Helix conductivity [1]

Waveguide wall [1] conductivity

Frequency [1]

Helix [1] pitch angle

Helix wire [1] d/D

→ Computer programs →

Outputs

90° bend parameters [2] and performance (bend loss, $z_1$, L, $R_o$)

Loss in 150' WG run [2] with one 90° bend $A_M/f_m$ $A_C/f_c$ $\alpha_{01}, \beta_{01}$ $\alpha_n, \beta_n, c_n, k_n$ for all p = 1 modes Diagnostics & assumption checks

[1] Not varied in parametric search

[2] Bend cases:
 a) Optimized for lowest loss
 b) $R_o$ = 0.75 m, L = $2z_1$
 c) $R_o$ = 1.5 m, L = $2z_1$

DIELECTRIC LINED
WAVEGUIDE

SHEATHED HELIX
WAVEGUIDE

1) Not varied in parametric search
2) Bend cases: a) Optimized for lowest loss
   b) $R_o = 0.75$ m, $L = 2z_1$
   c) $R_o = 1.5$ m, $L = 2z_1$ b) Bend with no length of uniform curvature.

COMPUTER AIDED DESIGN FOR TE$_{01}$ MODE CIRCULAR WAVEGUIDE

STATEMENT OF GOVERNMENTAL INTEREST

This invention was made with Government support under Contract No. NOOO39-87-C-5301 awarded by the U.S. Navy Department. The Government has certain rights in this invention.

REFERENCE TO MICROFICHE APPENDIX

Two separate computer program listings embodying the present invention are set forth in the attached microfiche appendix. This appendix contains 1 microfiche having 165 frames.

BACKGROUND OF THE INVENTION

The most common type of waveguide propagates signals in only one specific electromagnetic field pattern or mode, out of an infinite number of possible modes. Single-mode operation occurs because the waveguide is designed so that signals are in a frequency band which is sufficiently low that only the mode with the lowest "cutoff frequency" can exist and no other mode can propagate. If other modes were allowed to propagate, signal energy could couple into and out of various modes substantially distorting the signal. Such "conventional waveguide" is compact and easy to design, model and use. Unfortunately, maintaining only the lowest-cutoff mode in a given frequency band requires restriction of the waveguide cross section dimensions, and this, in turn, restricts power carrying capacity and limits the lowest achievable signal attenuation. As a result, design of some systems requiring microwave or millimeter wave signal transmission with high power or very low loss may be difficult or impractical.

An alternative type of waveguide is generally called "overmoded" in which a higher order mode is used, i.e. a mode which does not have the lowest cutoff frequency. Because other (unwanted) modes are also capable of existing as well as the desired transmission mode, this type of waveguide must feature internal structures which suppress the unwanted modes. Because internal structure, rather than restriction of cross section dimensions, is the basis for suppressing all but the desired mode, overmoded waveguide cross section can, in principle, be made arbitrarily large for a corresponding increase in power capacity and decrease in signal attenuation. Unfortunately, this type of waveguide, with unwanted mode suppression, is difficult to model and design, and its cross-sectional dimensions may not be amenable to compactness without significant design optimization.

· Historically, the more successful type of overmoded waveguide supports the circular TE$_{01}$ mode and uses either a dielectric lining or dielectric sheathed helix of insulated wire inside the circular cross section waveguide for suppression and decoupling of unwanted modes, e.g. see A. E. Karbowiak "Trunk Waveguide Communication", Chapmen and Hall Ltd. 1965. Both versions of overmoded TE$_{0l}$ waveguide were originally developed and tested for millimeter band (60-100 GHz) trunk line telecommunications between cities. Application of overmoded waveguide technology for high power and/or low loss transmission in microwave or millimeter wave radio communications and radar has also been suggested and developed to a limited degree, e.g. see R. M. Collins "Practical Aspects of High Power Circular Waveguide Systems" NEREM Record, Session 24, pp 182-183, (1962). However, more extensive use has been limited apparently due to limitations in optimization design modelinq within the limits of available materials and manufacturing methods.

The difficulty in modeling overmoded waveguide is primarily related to the effects of design characteristics on mode coupling phenomena. Such modeling is necessarily numerical. Further, trends towards design optimization are difficult to affix and can be substantially different for different design situations. For example, changing a design parameter value, e.g. dielectric constant, can suppress one mode while causing significant coupling of another mode or even render the waveguide inoperable. A significant amount of effort has been expended in developing the theory and in performing computations to develop a practical design for an overmoded waveguide, as revealed in the following references "Lined Waveguide" by H. G. Unger, Bell System Technical Journal, Vol. 41, No. 2, March 1962, pp. 745-768;

"Helix Waveguide Theory and Application" by H. G. Unger, Bell System Technical Journal, Vol. 37, No. 6., September 1958, pp. 1599-1663;

"Normal Modes and Mode Conversion in Helix Waveguide" by H. G. Unger, Bell System Technical Journal, Vol. 40, No. 1, January 1961, pp. 255-280;

"Helix Waveguide" by S. P. Morgan and J. A. Young, Bell System Technical Journal, Vol. 35, No. 6, November 1956, pp. 1347-1384;

"Winding Tolerances in Helix Waveguide" by H. G. Unger, Bell System Technical Journal, Vol. 40, No. 2, March 1961, pp. 627-643;

"Normal Mode Bends for Circular Electric Waves" by H. G. Unger, Bell System Technical Journal, Vol. 36, No. 5, September 1957, pp. 1292-1307; and "Normal Modes in Overmoded Dielectric Lined Circular Waveguide" by J. W. Carlin and P. D'Agostino, Bell System Technical Journal, Vol. 52, No. 4, April 1973, pp. 453-486.

However, unfortunately, this prior work cannot be directly extrapolated to compact, optimized bends, structures with less overmoding, and limited dielectric material selection for high power application in radar and radio communications. Accordingly, the need exists for practical circular overmoded waveguide of optimum design and for some mechanism to facilitate the determination of appropriate design for diverse practical applications, in order to accurately predict performance given selected design and material input parameter values.

SUMMARY OF THE INVENTION

The present invention relates generally to circular overmoded waveguide and, in particular, to circular overmoded waveguide of the dielectric lined and sheathed helix types which are optimally designed, utilizing a novel computerized design procedure to characterize and predict operational performance, given design and material input parameter values. The computer software proposed in accordance with the present invention improves upon the prior art noted above in that it enables higher performance waveguide design with higher predicted fidelity and increased region of validity. Specifically, the design software of the present invention has been incorporated into computer aided design (CAD) format and contains the following features:

Input design parameters including: a) for lined waveguide; operating frequency, waveguide radius, dielectric lining thickness, and lining complex permitivity; and b) for helix waveguide; frequency, helix radius, sheath thickness, helix wire diameter, helix insulation and pitch, and sheath complex permitivity.

Default values for waveguide diameter and bend curvature profile and bend length based on frequency and on design and experimental experience.

Bend optimization for minimum loss with both constrained and unconstrained bend length.

Diagnostics to indicate if any assumption or approximation validity is exceeded.

Warning if input values or resultant waveguide performance calculations indicate a potentially inoperable design.

Calculation of waveguide run loss based on run length and selected number of bends.

The foregoing features combine to render the design software of the present invention quite versatile and of substantial utility in the design of optimized circular overmoded waveguide for practical application. For example, by means of the proposed software, a significant number of design parameter value combinations in both the upper (X) and lower (S) microwave bands have been investigated, as well as a variety of practical materials, and based thereon, optimal overmoded waveguide structural design for straight and bend sections has been determined.

The computer software has been validated both numerically and experimentally. Numerical validation consisted of comparison of interim results with published results in the original, higher millimeter band telecommunications designs featured in the references. By way of experimental validation, designs determined using the novel software of the present invention have been reduced to practice, at S and X bands, and experimental performance results are in good agreement with the computer predictions.

In accordance with the foregoing discussion, a principal object of the present invention is to facilitate the design of low loss, high power overmoded waveguide specifically for S and X band operation and more generally for the microwave and lower millimeter wave bands.

Another object of the invention is to provide a circular overmoded $TE_{0l}$ waveguide of optimal design for either the dielectric lined or sheathed helix waveguide configuration or a combination thereof.

A still further object of the invention is to permit the computer aided design of circular overmoded waveguide of practical application.

These and other objects, purposes and characteristic features of the present invention will be pointed out or become apparent as the disclosure of the invention progresses, including the accompanying drawings, wherein.

DETAILED DESCRIPTION OF THE INVENTION

Figure 1A:
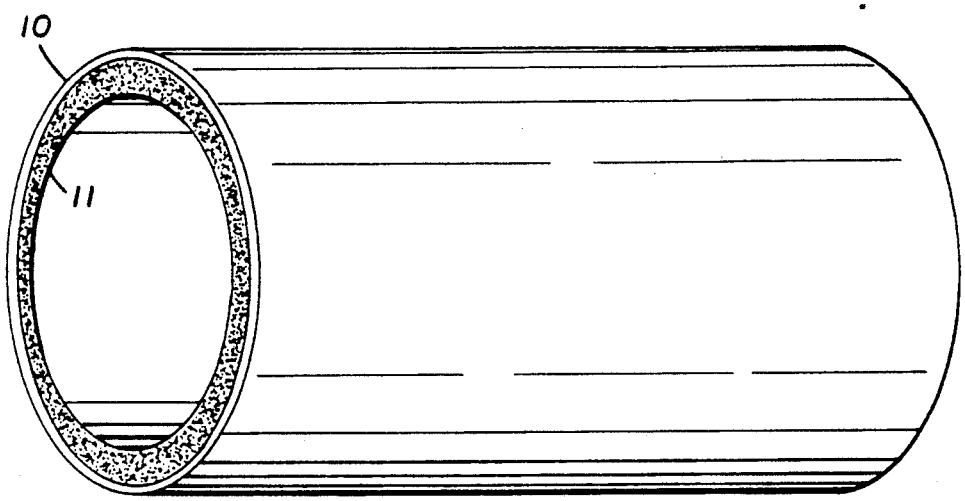
FIGS 1a and 1b illustrate typical sections of dielectric lined and sheathed-helix waveguide respectively.
Figure 1B:
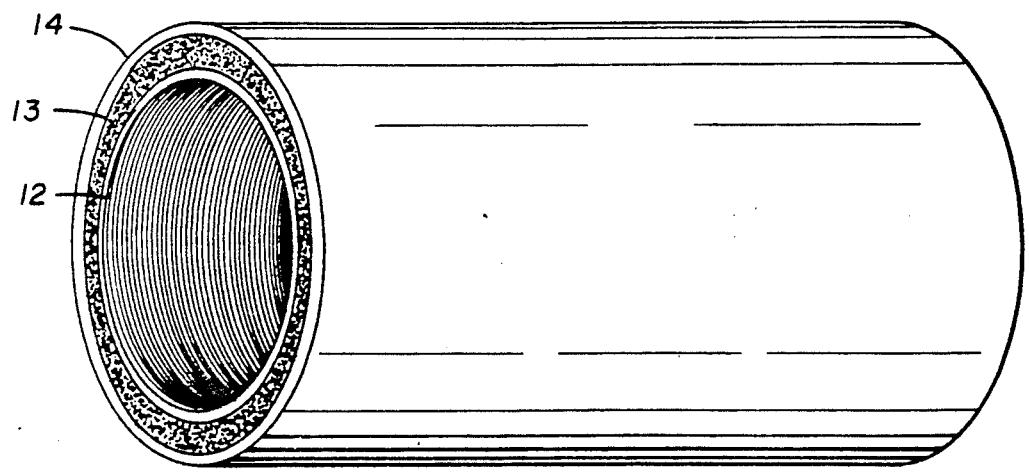

Referring first to FIGS. 1a and 1b, the most common configurations of overmoded circular waveguide are the dielectric lined structure shown in FIG. 1a and the sheathed helix structure shown in FIG. 1b. The dielectric lined waveguide is comprised of an outer conducting pipe 10 and an inner dielectric lining 11. The sheathed helix waveguide is formed of a closely wound insulated wire 12 surrounded by a two-layer jacket comprised of an inner layer of lossy dielectric 13 and an outer conductor layer or pipe 14. It is well-known that the sheathed helix configuration is particularly suited to strongly attenuating the unwanted modes while preserving the desirable transmission characteristics of the $TE_{0l}$ mode. Moreover, it has been determined, via a parameter study using the CAD software proposed in accord with the present invention, that the sheathed helix waveguide provides lower losses and shorter-length bends than the dielectric lined waveguide. Further, because the conducting helix shields the dielectric sheath from high field intensities, the helix waveguide is considered capable of supporting higher power than lined waveguide because of reduced possibility of dielectric field breakdown. As also noted above, the preferred embodiment of the present invention is concerned with facilitating an optimal design of such sheathed helix circular waveguide by means of a novel CAD software package.

Basically, the main computer programs of the present invention, for both helical and lined waveguide, call routines to: a) calculate complex eigenvalues which characterize the response of each electromagnetic field configuration or mode for the selected waveguide feature, b) calculate loss effects due to the waveguide structure and bends, and c) summarize the results in terms of the performance of a selected waveguide run. A separate program entitled FRESNEL calculates the coordinates of the particular waveguide bend contour determined by the CAD program.

The following Table 1 lists the parameter definitions and the parameter ranges embedded in the CAD programs provided in accordance with the illustrated embodiments of the present invention.

TABLE 1

Helix and Lined Waveguide Design Parameters
Definitions and Parameter Ranges

| | |
|---|---|
| a,A- | Helix inner radius or radius of inner surface of the dielectric lining ((8-16 cm S-Band) (2.5-4.5 cm X-Band)). Radius scale appropriately by program for other frequencies. |
| b,B- | Helix waveguide outer radius or radius of outer conductive surface for the dielectric lined waveguide ((8-16 cm S-Band) (2.5-4.5 cm X-Band)). Radius scaled appropriately by program for other frequencies. Basis: $TE_{01}$ mode has lower loss than the $TE_{11}$ mode in plain circular waveguide and lower loss than the $TE_{10}$ mode in rectangular waveguide (Reference 1). Low end of radius can support peak power with design margin (Reference 1) and high end of radius approaches expectred size constraints. |
| f- | Operating frequency selected by user. |
| $\delta$- | Sheath thickness ratio (B-A)/A ($\delta < .1$). Basis: Below $\delta = .025$ significantly reduces mode suppression and theory generally supports $\delta < .1$ (Reference 1). |
| $\epsilon_{re}$- | Complex dielectric constant of helix sheath or dielectric lining. Generally used are: Re $\{\epsilon_{re}\} = (2-10.5)$, - Im $\{\epsilon_{re}\} = (10^{-4}, 10^{-3}, \ldots 10^{0})$. Any values may be input by the CAD user. |
| $\sigma$- | Conductivity of outer conducting wall (copper for lined guide and aluminum for helix guide). Other values may be used. NOTE: the helix wire is assumed to be copper. |
| $\epsilon_{rw}$- | Dielectric constant of the helix wire insulation (1-3 typical). |
| d/D- | Ratio of bare wire to coated wire diameter for the helix ($> 0.8$ typical providing lower eddy current loss). |
| $\psi$- | Helix wire pitch angle ($< 1°$ for low loss). |
| $\theta_0$- | Total bend angle (90°). |
| $R_0$- | Minimum bend radius. Case 1: constrained to 8-16 wavelengths; Case 2: optimized for low loss and unconstrained length. |
| $Z_1$- | Length of the linear curvature profile between straight waveguide and the bend region of minimum radius $R_0$. |
| L- | Total length of bend between straight waveguide sections ($L = \theta_0 R_0 + Z_1$ for optimized low loss bend and $L = 2Z_1$ for constrained bends). |
| $A_m/f_m$- | Coefficient of added attenuation in a bend due to the difference between the straight waveguide modal field configuartions and the local modal fields in the bend (a "mode distortion" loss). Note that $A_m$ is the mode distortion loss in a bend for a bend profile characterized by $f_m$ (see Reference 1). |
| $A_c f_c$- | Coefficient of added attenuation in a bend due to power transfer into unwanted modes (mode conversion loss). Note that $A_c$ is the mode conversion loss in a bend for a given bend profile parameter $f_c$ (see Reference 1). |
| $\alpha_{01}$- | Attenuation coefficient for the $TE_{01}$ mode. |
| $\beta_{01}$- | Propagation coefficient for the $TE_{01}$ mode. |
| $\alpha_n$ or $\alpha_{p,n}$- | Attenuation coefficient for hybrid p,n mode. |
| $\beta_n$ or $\beta_{p,n}$- | Propagation coefficient for hybrid p,n mode. |
| $c_n$- | Coupling coefficients between the $TE_{01}$ mode and the unwanted ($p=1, n=1, 2 \ldots$) modes. |
| $k_n$- | Complex eigenvalue for the p,n mode. |

(See Appendix A - summary of parameter definitions/relationships.)

Detailed Summary of Helix Waveguide CAD Programs

The following is a summary of the helix waveguide CAD software. A detailed program listing is provided in the microfiche appendix.

Figure 3A:
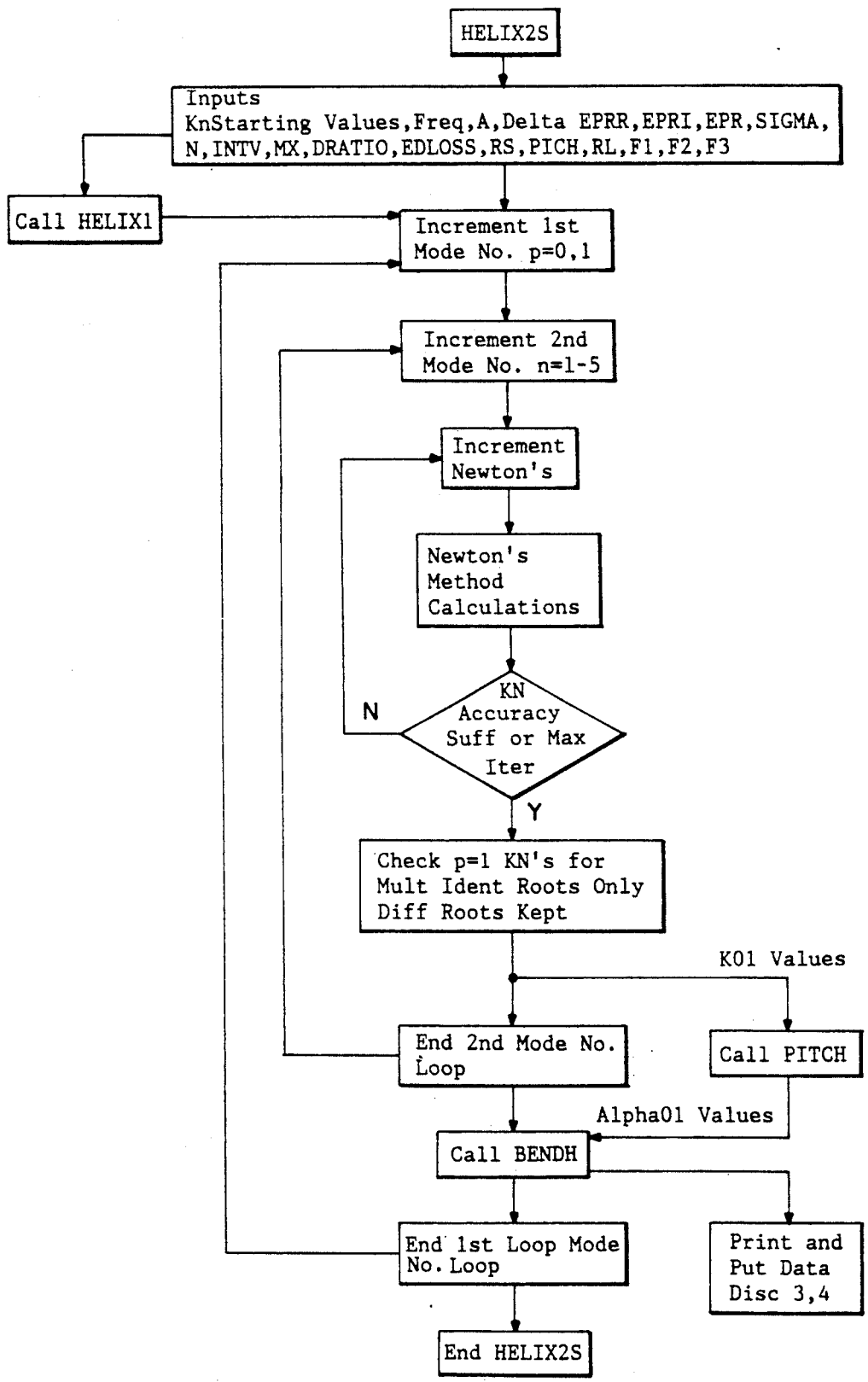
FIGS. 3a through 3f illustrate flow charts of the main CAD software program and associated subroutines proposed in accord with the present invention for designing sheathed helix waveguide.
Figure 3B:
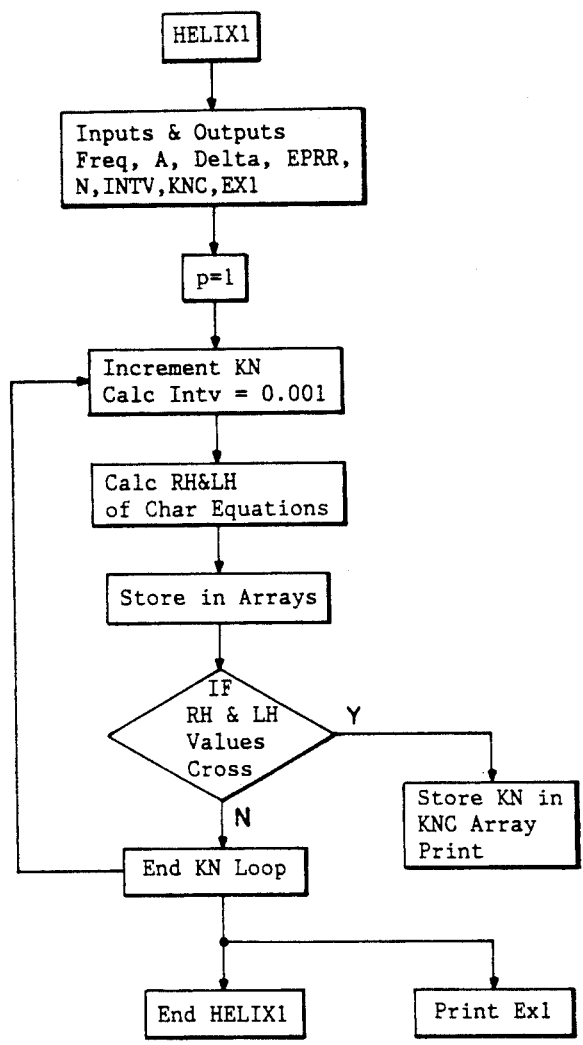

Referring to FIG. 3a, the flow chart for the main program HELIX2S is illustrated. The INPUTS block contains the parameters needed to execute the program and have been defined in the Table 1 set fourth hereinabove (see also FIG. 4). The main program HELIX2S first calls the HELIX1 subroutine (shown in FIG. 3b) to obtain starting eigenvalues in addition to the classical eigenvalues for a plain, perfectly conducting, circular waveguide. These are used as initial trial approximations for calculating the complex eigenvalues which characterize the propagation and attenuation of each electromagnetic field configuration or mode within particular waveguide. The eigenvalues are the solutions to the following characteristic equation derived from Maxwell's equations subject to the boundary conditions on the electromagnetic fields due to the sheathed helix waveguide structure (see Bell Systems Technical Journal, Vol. 37, No. 6, September 1958 referenced above).

$$\frac{J_p'(k_n)}{J_p(k_n)} - \left(\frac{ph_n}{kk_n}\right)^2 \frac{J_p(k_n)}{J_p'(k_n)} =$$

$$\frac{\epsilon_{re}k_n}{k_n^e} \left[ \frac{H_p^{(2)'}(k_n^e) - cH_p^{(1)'}(k_n^e)}{H_p^{(2)}(k_n^e) - cH_p^{(1)}(k_n^e)} - \right.$$

$$\left. \frac{1}{\epsilon_{re}} \left(\frac{ph_n}{k_n^e k}\right)^2 \frac{H_p^{(2)}(k_n^e) - c'H_p^{(1)}(k_n^e)}{H_p^{(2)'}(k_n^e) - c'H_p^{(1)'}(k_n^e)} \right]$$

where:

$p$ = azimuthal mode order, $n$ = radial mode order, $k = 2\pi/\lambda$, the free space wavenumber with $\lambda$ = wavelength, $k_n$ = complex eigenvalue for the $(p, n)$ mode, $h_n = [k^2 - (k_n/a)^2]^{\frac{1}{2}} =$ complex propagation factor for $(p, n)$ mode, $k_n^e = a(\epsilon_{re}k^2 - h_n^2)^{\frac{1}{2}}$ $c = \frac{H_p^{(2)}(\rho k_n^e)}{H_p^{(1)}(\rho k_n^e)},$ $c' = \frac{H_p^{(2)'}(\rho k_n^e)}{H_p^{(1)'}(\rho k_n^e)}$, (prime subscripts imply derivatives)

$\rho = b/a$, $J_n(x)$ = Bessel function, $H_n^{(1)}(x)$ = Hankel function of the first kind, and:

$H_n^{(2)}(x)$ = Hankel function of the second kind.

The indices p and n identify helix waveguide modes in the same manner in which $TE_{p,n}$ and $TM_{p,n}$ identify modes of different order in plain metal-wall waveguides. However, helix waveguide modes are not purely transverse electric (TE) or transverse magnetic (TM) and so, the indices p and n refer to the combined set of hybrid TE and TM modes. As the sheath thickness and helix winding separations approach zero, the $p=0$ (circular) modes become pure $TE_{0n}$ and $TM_{0n}$ modes, and $p=1$ corresponds to pure $TE_{1n}$ and $TM_{1n}$ modes.

Newton's method is used to find the complex eigenvalues starting with their real parts, *HANDBOOK OF NUMERICAL METHODS AND APPLICATIONS*, by Louis G. Kelly Addison-Wesley, 1967. If the accuracy is not sufficient and the maximum number of iterations is not attained, Newton's method is reiterated. When the iteration process is completed, the roots are checked for multiplicity; only one value of each of these roots is kept.

More particularly, the HELIX1 subroutine (see FIG. 3b) is called by the main program to locate the real parts of the roots of the hybrid, complex transcendental equation over a specified range. These real parts of eigenvalues are stared in an array for future use as starting values for the iteration process in the main program. The INPUTS & OUTPUTS block of the HELIX1 subroutine indicates both the input parameters and calculated results of the subroutine. This subroutine finds real eigenvalues &or noncircular modes only. Real KN's are incremented and the right- and left-hand sides of transcendental equations are evaluated. The roots, i.e. the KN values for which the sides of the equation are equal, are stored in an array KNC, and EX1 contains the value of the number of roots.

Figure 3C:
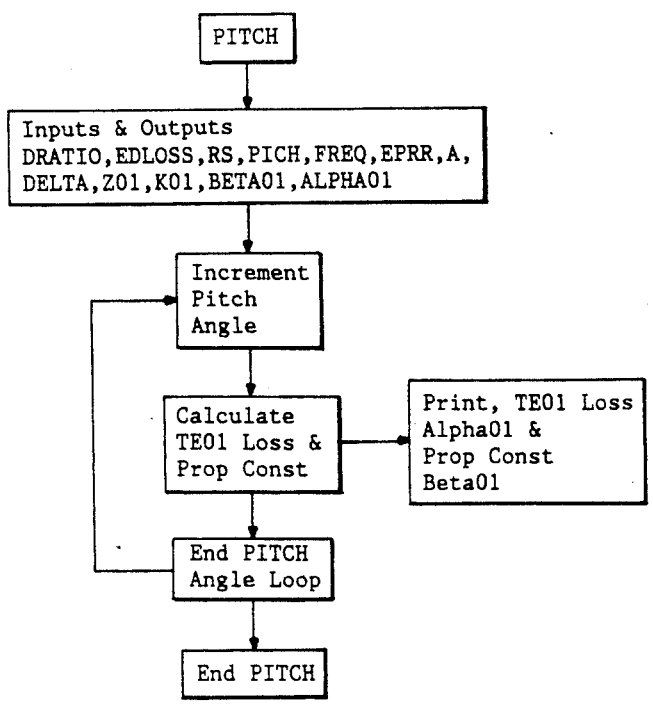

The PITCH subroutine (FIG. 3c) calculates the effect of the helix pitch angle on the propagation constant and the attenuation of the (circular) $TE_{01}$ mode. In FIG. 3c, the INPUTS & OUTPUTS block contains the input parameters and the calculated loss factors and propagation constants due to the helix pitch angle. More specifically, if the helix is constructed of a single wire, then pitch angle is: $\psi = \arctan(D/2\pi a)$. For more expedient manufacturing, a number of wires (m) may be simultaneously wound, and: $\psi = \arctan(mD/2\pi a)$. In accord with the Bell Systems Technical Journal, Vol. 40, No. 2, March 1961, the attenuation coefficient due to wire pitch is $$\alpha_p = \left(\frac{868.6 \, k_{01}^2}{k\beta_{01}a^3}\right) \sin^2\psi Re\{Z_{01}\}/Z_o,$$

where:

$k_{01} = k_n(p = 0, n = 1)$, i.e., the $TE_{01}$ mode eigenvalue calculated from Eq. 3-3.

$\beta_{01} = Re\{h_{01}\}$ where $h_{01} = h_n(p = 0, n = 1)$, i.e., the $TE_{01}$ mode propagation constant.

$Re$ = real part, $Z_o = 376.7$ ohms = free space impedance, and $Z_{01}$ = the $TE_{01}$ surface impedance from Eq. 3-4.

The coefficient 868.6 converts the attenuation coefficient from nepers/cm to dB/m.

Helix waveguide bends must be carefully contoured to minimize mode coupling and distortion losses. The BENDH subroutine shown in FIG. 3d uses the eigenvalues and PITCH subroutine angle loss information to calculate bend losses, straight guide, and total losses for a given run of helix waveguide. BENDH computes approximate normalization coefficients $N_n$ and coupling coefficients $c_n$ according to the following equations and checks their validity.

$$c_n = \frac{N_n}{2ka} \frac{k_{01}k_n^2}{(k_{01}^2 - k_n^2)} J_1(k_n)(\pi h_n/h_{01})^{\frac{1}{2}} \left[ 1 + \right.$$

$$\left. h_{01}/h_n + \left(\frac{h_{01} + h_n}{h_{01} - h_n}\right) Y_n \right]$$

$$N_n = \sqrt{2/\pi} \, [1/J_1(k_n)][(k_n^2 - 1)Y_n^2 h_n^2/k^2 + 1/Y_n^2 +$$

$$k_n^2(1 - 1/(ka)^2) + 2(1/Y_n - Y_n) + X]^{-\frac{1}{2}},$$

with:

$Y_n = \frac{J_1(k_n)}{k_n J_1'(k_n)}$, and where

-continued
$$h_n = [k^2 - (k_n/a^2)]^{\frac{1}{2}},$$

$$\alpha_n = -Im\{h_n\},$$

and:

$$\beta_n = Re\{h_n\}.$$

The above equations are implemented in the BENDH subroutine to determine the integrated bend losses for a given bend radius contour. As taught in the Bell Systems Technical Journal, Vol. 36, No. 5, September 1957, the total waveguide bend loss $A_T$ in dB is given by the equation:

$$A_T + \alpha_{01}L + A_M + A_C$$

where:

$A_M$ = added attenuation due to the difference between the straight waveguide modal field configurations and the local modal fields in the bend, i.e., a "mode distortion" loss (dB),
and:

$A_C$ = added attenuation due to power transfer into unwanted modes in the bend, i.e., mode conversion loss (dB).

More specifically, requiring $\Delta\alpha_n << \Delta\beta_n$:

$$A_M = f_m \sum_n c_n^2 \Delta\alpha_n / (\Delta\beta_n)^2,$$

and:

$$A_C = f_c \sum_n c_n^2 / (\Delta\beta_n)^4,$$

where summation is taken over the unwanted $p-1$ modes which couple to the $TE_{0l}$ mode in a bend, and:

$$\Delta\beta_n = \beta_{1,n} - \beta_{01},$$

$$\Delta\alpha_n = \alpha_{1,n} - \alpha_{01}(dB/m).$$

(Note: $\Delta\alpha_n > 0$ is required.)

Figure 8:
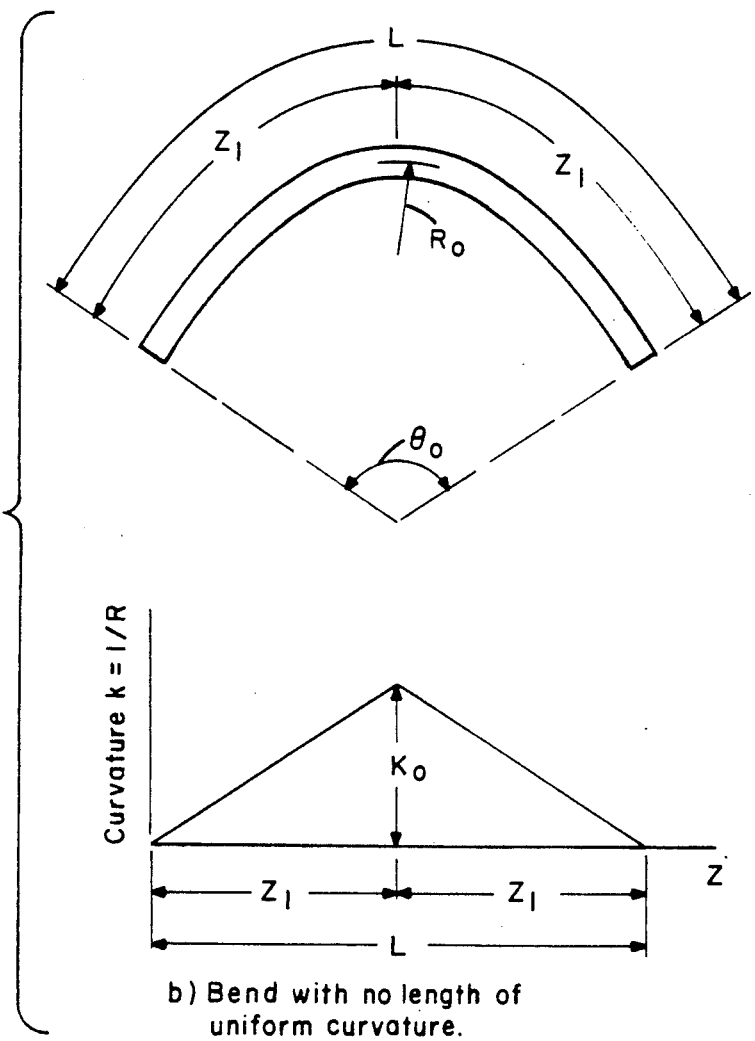

*The bend functions $f_m$ and $f_c$ are generally defined as:

$$f_c = [L - (4/3)z_1]/R_o^2$$

$$f_m = 4/(R_o z_1)^2.$$

where $z_1$, L and $R_0$ are the bend parameters depicted in FIG. 8 showing an example of a waveguide bend with linear curvature profile.

Figures 3D, 3E:
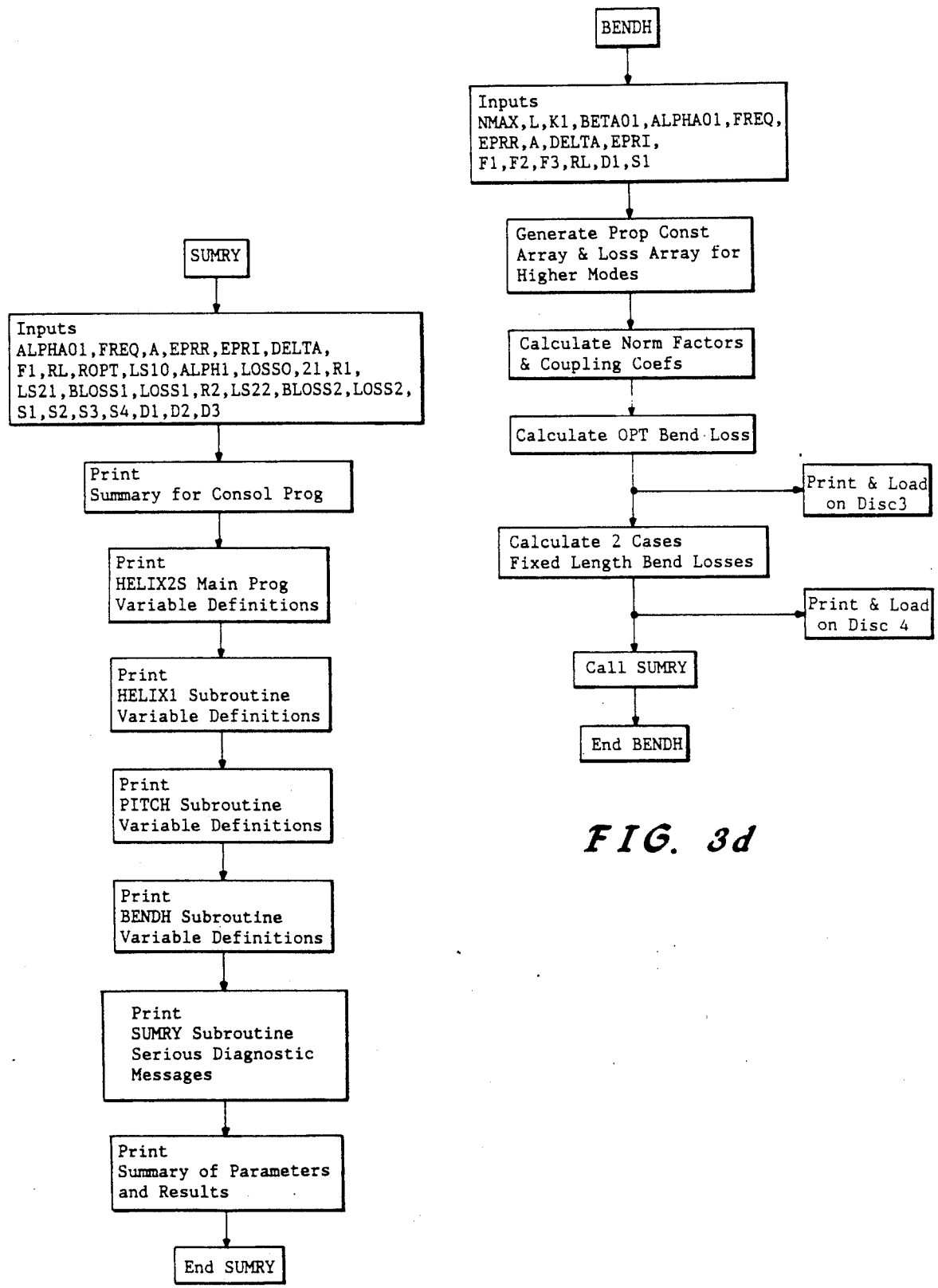

The SUMRY subroutine illustrated in FIG. 3e is called from the BENDH subroutine and prints out the summary results, after which the computer program HELIX2S is terminated.

Figure 3F:
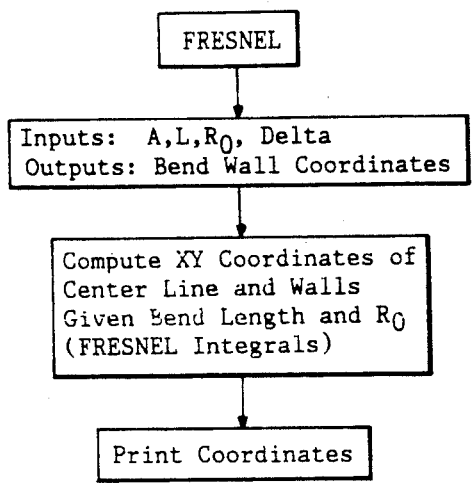

As mentioned previously, a separate program FRESNEL shown in FIG. 3f computes the coordinates of the bend for design and fabrication purposes, based on standard Fresnel integrals, see *ELECTROMAGNETIC WAVES AND RADIATING SYSTEMS*, by Edward C. Jordan and Keith G. Bolmain, 2nd Ed. Prentice-Hall, Inc. 1968). The FRESNEL program is executed after the HELIX2S program has been executed and it determines and prints out bend coordinates for a waveguide given the bend angle, bend length, radius and wall thickness.

Detailed Summary of Lined Waveguide CAD Program

The lined waveguide CAD program proposed in accordance with the present invention is structured similar to the helix CAD program just described. The underlying theoretical equations, certain computation methods and conditions for validity are different, however. A detailed program listing is contained in the microfiche appendix.

Figure 2A:
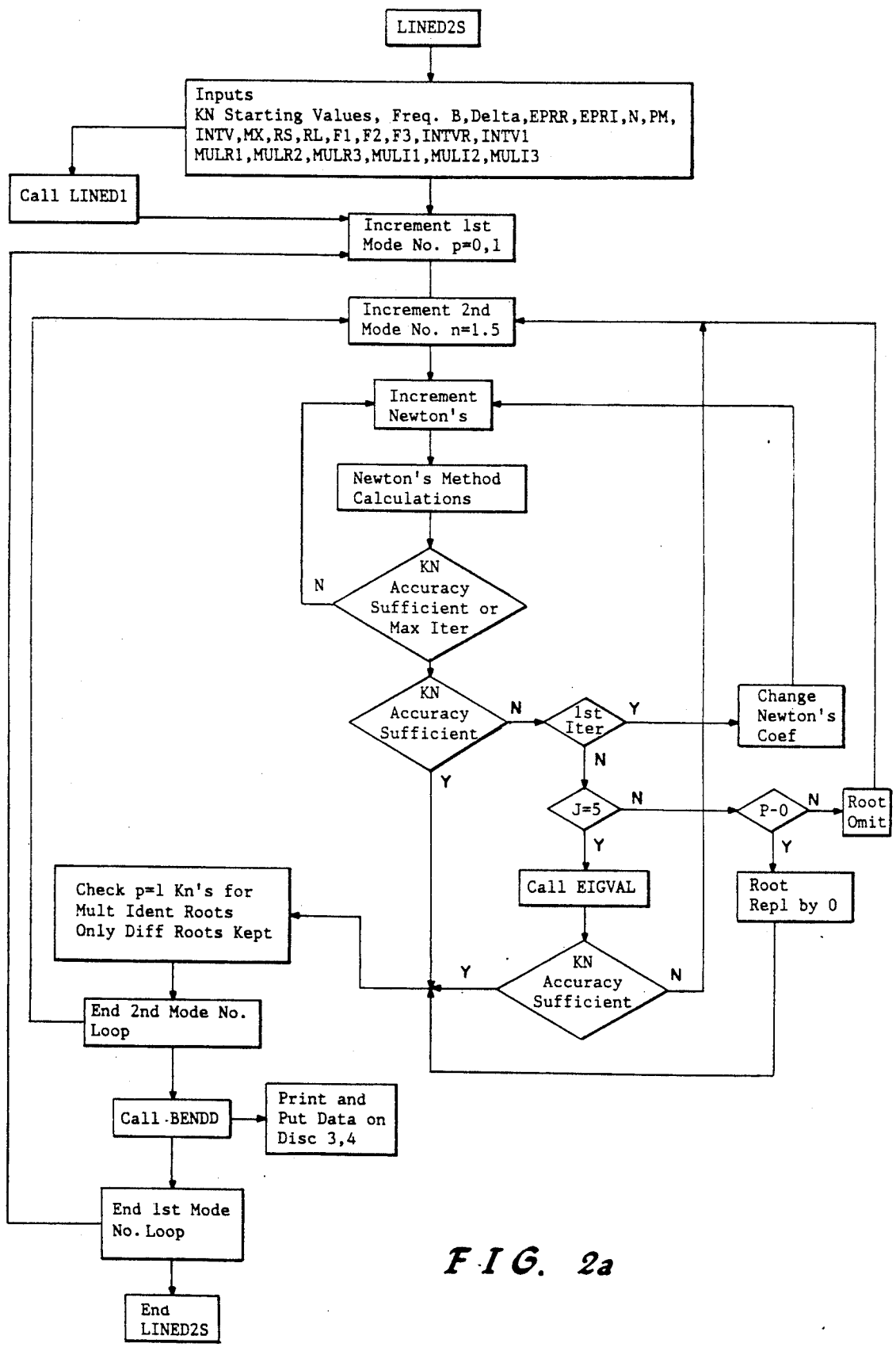
FIGS. 2a through 2e illustrate flow charts of the main CAD software program and associated subroutines proposed in accord with the present invention for designing dielectric lined waveguide.
Figure 4:
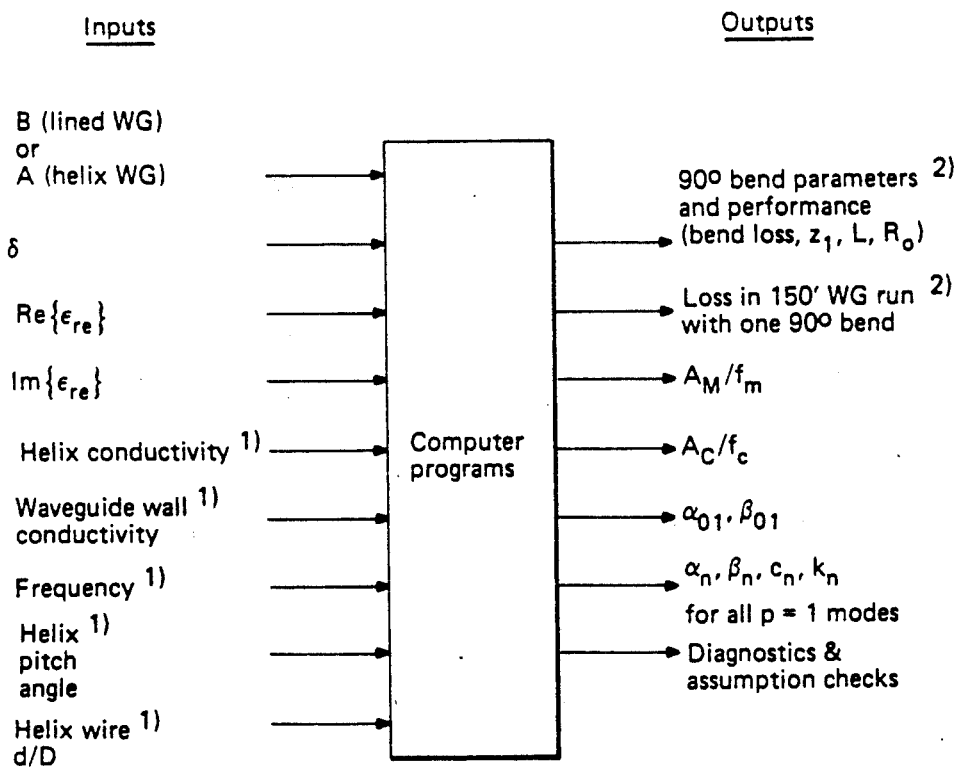
FIG. 4 is a diagrammatic representation of the input parameters and the output characteristics generated by the software programs depicted in FIGS. 2a-2e and 3a-3f.

Referring now to FIG. 2a, a flow diagram of the main program LINED2S is illustrated, and here again, the INPUTS block contains the parameters needed to execute the programs (see FIG. 4 and Table 1 set forth hereinabove).

Figure 2B:
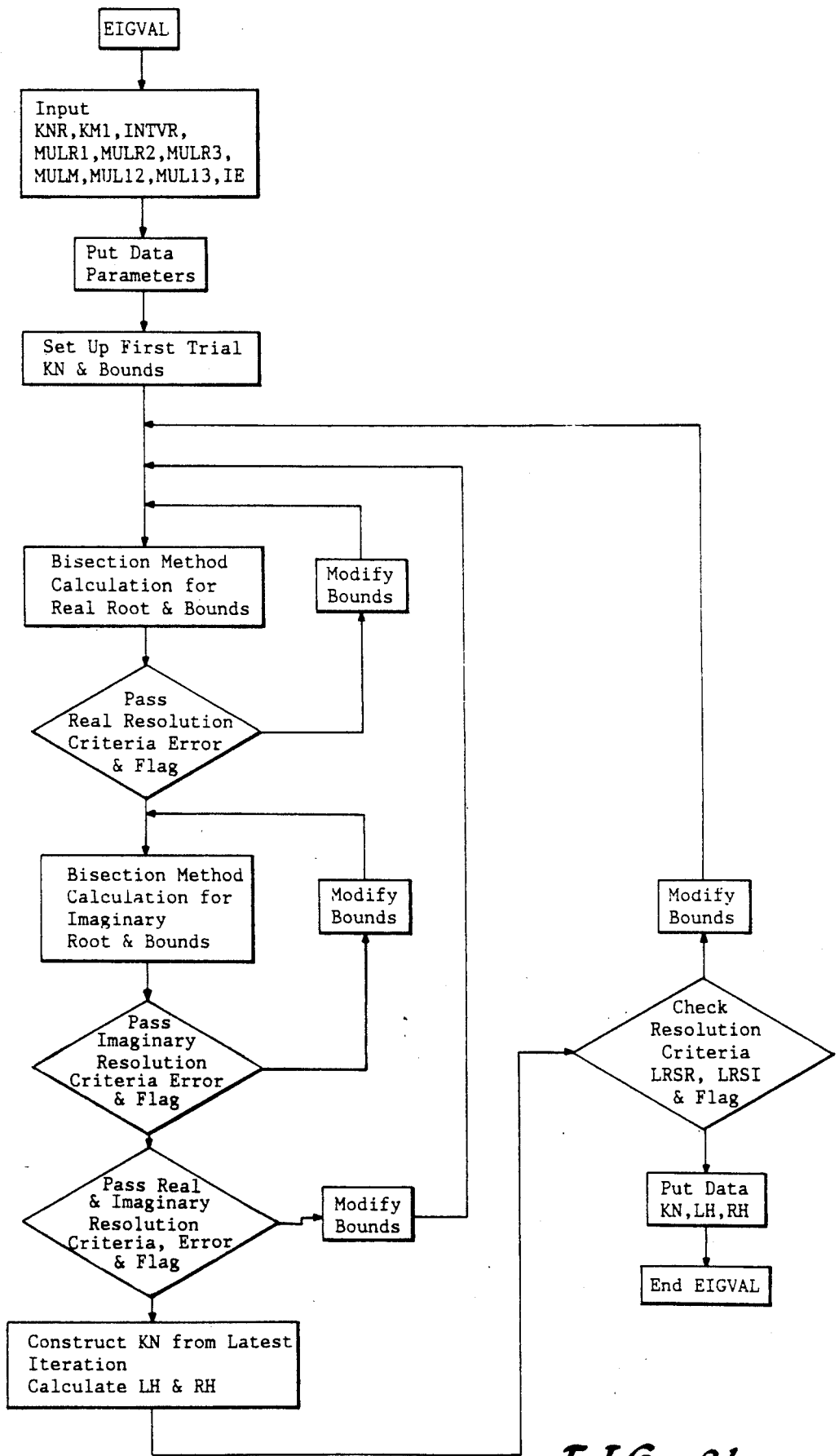
Figure 2C:
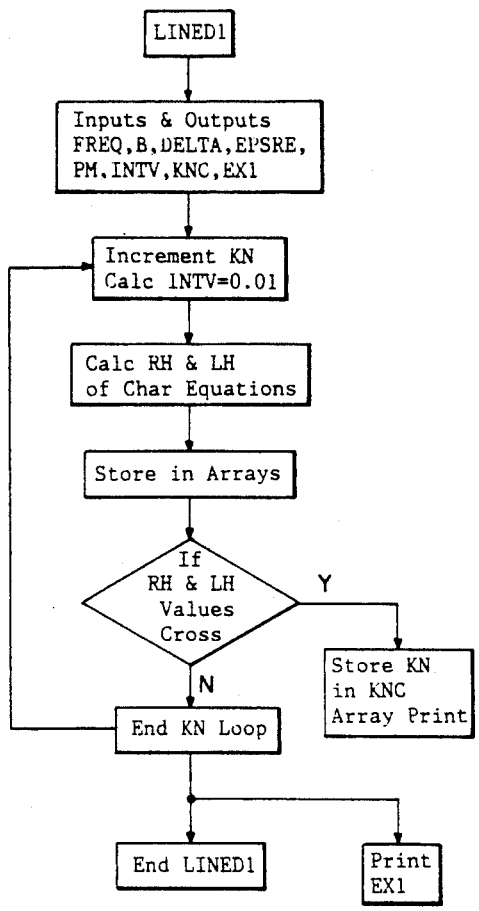
Figure 2D:
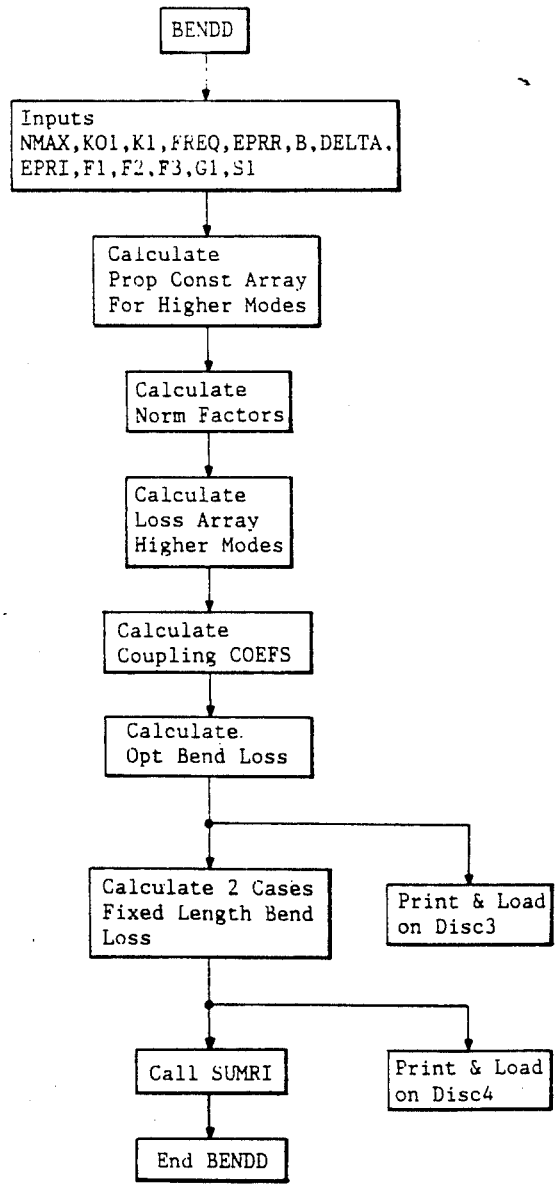

The LINED1 subroutine, see FIG. 2b for flow chart, is called first by the main program to obtain starting eigenvalues, in addition to those for a plain, perfectly conducting, circular waveguide as starting approximations in computing the complex eigenvalues from the characteristic equation for dielectric lined, circular cross-section waveguide (see Bell Systems Technical Journal, Vol. 52, No. 4, April 1973) as follows:

$$\left[ \frac{J_p'(k_n)}{J_p(k_n)} - \left(\frac{k_n}{k_n^e}\right) \frac{H_p^{(2)'}(k_n^e) - c'H_p^{(1)'}(k_n^e)}{H_p^{(2)}(k_n^e) - c'H_p^{(1)}(k_n^e)} \right].$$

$$\left[ \frac{J_p'(k_n)}{J_p(k_n)} - \left(\epsilon_{re}\frac{k_n}{k_n^e}\right) \frac{H_p^{(2)'}(k_n^e) - cH_p^{(1)'}(k_n^e)}{H_p^{(2)}(k_n^e) - cH_p^{(1)}(k_n^e)} \right] =$$

$$p^2(\epsilon_{re} - 1)^2 \frac{h_n^2 a^4 k^2}{k_n^2 (k_n^e)^4}$$

The LINED1 subroutine finds the real eigenvalues for non-circular modes only. As the real KN's are incremented, the left- and right-hand sides of the transcendental equation are evaluated. The roots (where the right and left sides are equal) are then stored in an array KNC, and EX1 contains the value of the number of roots.

Newton's method is used to find the complex eigenvalues starting with the approximations for their real parts. If the accuracy is not sufficient and the maximum number of iterations is not reached, Newton's method is reiterated. After performing all iterations on the various modes, the EIGVAL subroutine is called if the desired accuracy for the roots originated by LINED1 has not been obtained. EIGVAL comprises a complex bisection routine which uses, as starting values, the real eigenvalues stored by LINED1. After all the processes are completed, the roots obtained are checked for multiplicity; only one value of each of these roots is kept.

The program is then ready to calculate the bend losses, and subroutine BENDD is called. This subroutine computes the normalization and coupling coefficients $N_n$ and $c_n$, using the eigenvalues to calculate bend losses, straight guide losses, and total losses for a given run of lined waveguide. The computation of $N_n$ and $c_n$ are performed in accord with the following equations:

$$N_n(p \neq 0) = \left\{ \frac{\pi}{2} (k_n J_p(k_n))^2 \left\{ \left(1 + d_n^2 \frac{h_n^2}{k^2}\right)\left(1 - \frac{p^2}{k_n^2} + k_n^2 y_{pn}^2 + 2y_{pn}\right) - 2d_n \frac{p}{k_n^2} [1 + h_n^2/k^2 - (1 + h_n^2/(\epsilon_r k^2))\epsilon_{re}(k_n/k_n^e)^4] + \frac{k_n^2}{2(k_n^e)^3} \left[\epsilon_{re} \frac{2\delta k_n^e + \sin(2\delta k_n^e)}{\sin^2(\delta k_n^e)} + (d_n h_n/k)^2 \frac{2\delta k_n^e - \sin(2\delta k_n^e)}{\cos^2(\delta k_n^e)} \right] \right\} \right\}^{-\frac{1}{2}},$$

$y_{pn} = J_p'(k_n)/[k_n J_p(k_n)],$ $Z_{pn}(\gamma) = H_p^{(2)}(\gamma) - cH_p^{(1)}(\gamma),$ $\zeta_{pn}(\gamma) = H_p^{(2)'}(\gamma) - c'H_p^{(1)'}(\gamma),$ $c = H_p^{(2)}(\rho k_n^e)/H_p^{(1)}(\rho k_n^e),$ $c' = H_p^{(2)'}(\rho k_n^e)/H_p^{(1)'}(\rho k_n^e),$ $\chi_n^e = k_n^e/a,$ $\chi_{01}^e = \chi_n^e(p = 0, n = 1),$ $\mu_o = 4\pi \times 10^{-7}$ henry/m = free space permeability $$d_{01} N_{01} = \left\{ \pi(k_{01} J_0(k_{01}) h_{01}/k)^2 \left[ 1 + k_{01}^2 y_{01}^2 + 2y_{01} + \frac{k_{01}^2}{(k_{01}^e)^3} \cdot \frac{2\delta k_{01}^e - \sin(\delta k_{01}^e)}{2\cos^2(\delta k_{01}^e)} \right] \right\}^{-\frac{1}{2}},$$

$$d_n(p \neq 0) = \left( \frac{k_n k_n^e}{h_n a} \right)^2 \frac{1}{p(\epsilon_{re} - 1)} \left( \frac{\epsilon_{re}}{k_n^e} \cot(\delta k_n^e) \right)$$

and where $Z'_{pn}(\gamma)$ and $\zeta_{pn}(\gamma)$ are derivatives of $Z_{pn}(\gamma)$ and $\zeta_{pn}(\gamma)$, respectively.

$c_n = [(\pi/2)\sqrt{h_{01}h_n}\, k_{01}^2 a N_n(d_{01}N_{01})J_1(k_n)J_0(k_{01})/(k_{01}^2 - k_n^2)] \cdot$ $$\left\{ (1 + h_{01}/h_n)\left\{ 1 + d_n + \frac{d_n h_n^2}{k^2} \left( \frac{2k_n^2}{k_n^2 - k_{01}^2} - 1/\chi_n \right) - \left[ 1 + d_n \left( \frac{k_n^2 + k_{01}^2(1 - 2k_n^2/(ka)^2)}{k_n^2 - k_{01}^2} \right) \right] \chi_{01}/\chi_n - d_n k_n^2 \chi_{01} + \epsilon_{re}(k_n/k_n^e)^2 U \frac{k_{01}^2 - k_n^2}{(k_n^e)^2 - (k_{01}^e)^2} \right\} + V d_n k_n^2/(ka)^2 \right\},$$

where:

$U = 1 - [k_n^e \tan(\delta k_{01}^e)]/[k_{01}^e \tan(\delta k_n^e)] - d_n k_n^e \tan(\delta k_n^e)[1 - k_n^2/(\epsilon_{re}k^2 a^2)] + d_n \tan(\delta k_{01}^e)(k_n^e)^2/k_{01}^e,$ -continued $$V = \left[ 1 + \frac{h_{01}(k_n^e)^2}{h_n(k_{01}^e)^2} \right] \left[ \frac{k_n^2 - k_{01}^2}{(k_n^e)^2 - (k_{01}^e)^2} \right] k_{01}^e \tan(\delta k_{01}^e) + (k_{01}^2 + h_{01}k_n^2/h_n)\chi_{01} + (h_{01}/h_n)(\chi_{01}/\chi_n - 1),$$

$\chi_n = \dfrac{J_1(k_n)}{k_n J_0(k_n)},$ $\chi_{01} = \dfrac{J_1(k_{01})}{k_{01} J_0(k_{01})}.$ In one practical application of the invention, the computed normalization and coupling coefficients are used to calculate losses in an optimized bend and two cases of fixed length bends.

Figure 2E:
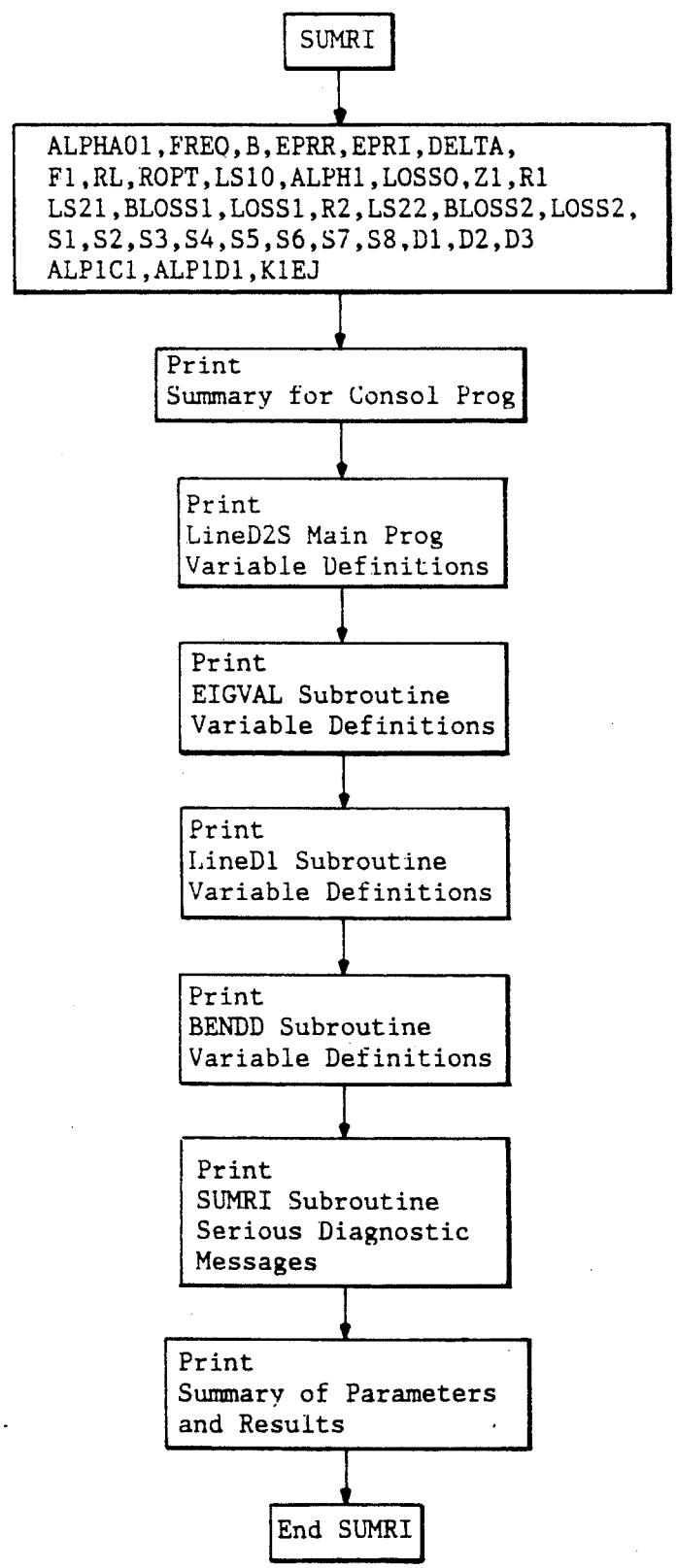

The SUMRI subroutine (see FIG. 2e) is called from BENDD and prints the summary definitions of the main program and each subroutine, definitions of the variables of each subroutine, serious diagnostic messages, and a summary page of parameters and results for the optimized bend and the two fixed length bends. As with the helix waveguide, the FRESNEL program (see FIG. 3f) calculates the bend coordinates for a lined waveguide given the bend angle, bend length, radius and wall thickness, the these coordinates are used to manufacture the bend.

SAMPLE RESULTS

As described in detail hereinabove, the computer programs proposed in accordance with the present invention calculate relevant performance characteristics for straight and bent waveguide for a wide range of design parameter combinations. This permits determination of the most advantageous design(s) in terms of performance and size constraints. FIG. 4 illustrates, in summary, the input design parameters and the output characteristics generated by these programs. For each combination of input parameters, the bend curvature parameters optimized for low loss and resulting bend loss are calculated as well as the corresponding attenuation in bends with $R_o = 0.75$ m and 1.5 m and $L = 2Z_1$. Loss coefficients $A_M/f_m$ and $A_C/f_c$ are also provided so that attenuation due to bending may be calculated for any combination of L, $Z_1$, and $\theta_o$ desired (see Table 1 above for definitions). Straight guide loss and propagation characteristics are also provided.

Utilizing the waveguide design software provided in accordance with the present invention, a parametric study has been performed of predicted performance versus design configuration for both sheathed-helix and lined overmoded waveguide. The performance measures considered included:

low $TE_{0l}$ mode attenuation
suppression of unwanted modes
power capacity
minimum bend length
air cooling capability
high temperature rating
light weight
dielectric resistance to high field intensity and the relevant design parameters considered were as follows:

Waveguide radius (helix or lined guide wall)
S-band: 8 to 16 cm

X-band: 2.5 to 4.5 cm

Dielectric sheath/lining

Thickness (fraction of waveguide radius): 0.025 to 0.1
Real part of dielectric constant: 2 to 10.5
Imaginary part of dielectric constant: $-10^{-4}$ to $-10°$

Helix wire

Pitch angles from 0.1° to 5°
Ratio of wire diameter d to wire coating diameter D, $d/D > 0.8$
Wire diameter ~1% of wavelength
Low permitivity wire coating ($|\epsilon| < 3.5$, loss tan $< 10^{-2}$)

Bend

Linear curvature profile (section of Cornu spiral)
Bend length:
S-Band: 2.5 m, 5 m, optimized <10 m
X-Band: 0.8 m, 1.6 m, optimized <3 m

Conductors

Helix waveguide outer conductor: aluminum or epoxy graphite
Helix and lined waveguide wall: copper
Based upon the results of this parametric study, the following design guidelines have resulted, for microwave through lower millimeter bands.
Dimensions for best constrained-size bend performance:
Inner diameter ID (i.e., helix diameter or dielectric lining diameter):
1¾ to 2 wavelengths
Ratio of bend length L to ID: 16 to 17
(Linear variation in 1/R with R = Bend radius)
Best performance (i.e., lowest bend loss & lowest waveguide run loss with bends over <20% of run):
Sheathed helix configuration:
Sheath thickness (Delta): 7.5 to 10% of waveguide ID
Real part of sheath dielectric constant: 6 to 11
Imaginary part of sheath dielectric constant: −0.005 to −0.05
Moderate performance:
Sheathed helix configuration:
Sheath thickness (Delta): 7.5 to 10% of waveguide ID
Real part of sheath dielectric constant: 2 to 11
Imaginary part of sheath dielectric constant: −0.001 to −0.1
Dielectric lined waveguide configuration:
Dielectric lining thickness (Delta): 7.5% of waveguide ID
Real part of lining dielectric constant: 4 to 6
Imaginary part of lining dielectric constant: −0.0005 to −0.005

(Must avoid lining resonance condition: i.e., $$\text{Lining thickness} = \frac{m\lambda}{4\sqrt{\text{Real Part Dielectric Constant} - 1}}$$

Where $m = 1, 2, 3, \ldots$ $\lambda$ = wavelength

Figure 5:
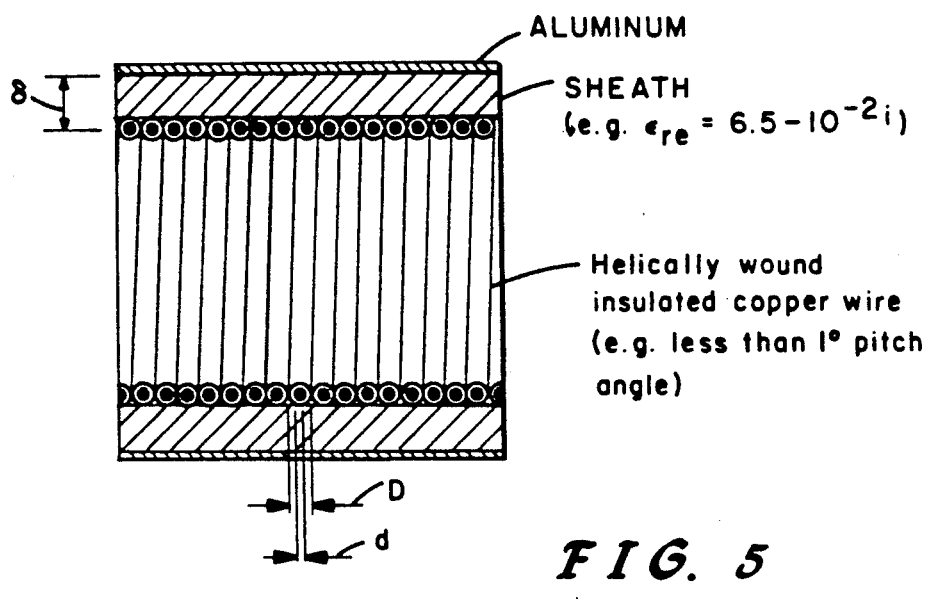
FIG. 5 is a simplified cross-sectional view of a segment of sample sheathed-helix waveguide designed in accordance with the preferred embodiment of the invention.
Figure 6:
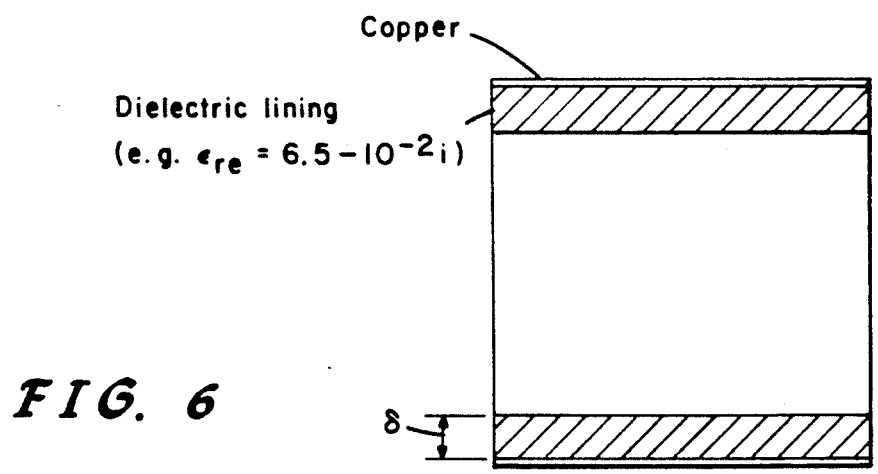
FIG. 6 is a simplified cross-sectional view of a segment of sample lined dielectric waveguide designed in accordance with the present invention.
Figure 7:
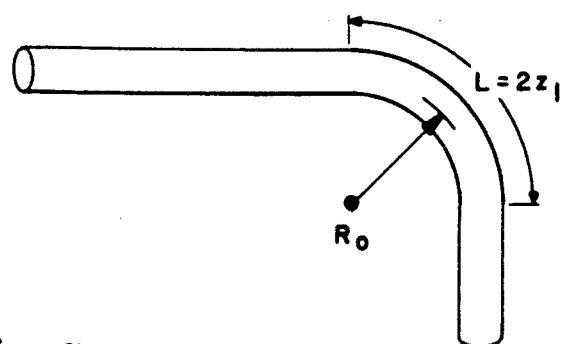
FIG. 7 is a simplified diagram of a sample waveguide bend configuration designed in accordance with the present invention; and, FIG. 8 is a simplified diagram of sample waveguide bend/curvature profiles.

Based upon the results from this parametric study, it is further apparent that helix waveguide provides lower loss and much more design flexibility than dielectric lined waveguide. This is primarily because the helix configuration suppresses unwanted modes better and because the $TE_{01}$ mode, supported by the helix, is not exposed to dielectric losses as in the lined waveguide case. The helix waveguide is also desirable because the dielectric sheath is not exposed to high field strengths in high power applications. The primary disadvantage of helix waveguide is that it is more difficult to construct. FIGS. 5, 6 and 7 of the accompanying drawings illustrate respectively a samples of the sheathed-helix and dielectric lined waveguide designed in accordance with the present invention, as well as a sample waveguide bend.

Utilizing the waveguide design software provided in accordance with the present invention, the following design characteristics were selected for practical application:

| Parameter | S-band | X-band |
| --- | --- | --- |
| Helix diameter | 16 cm | 6 cm |
| Sheath thickness | 0.8 cm | 0.3 cm |
| Sheath dielectric* constant | 5.2-0.51 (both bands) | |
| 49 (*e.g. Emerson & Cuming ECCO S2L4952 w/ high dielectric strength and heat resistance) | | |
| Helix | Polymide coated magnet wire | |
| wire size | #14 | #21 |
| d/D | .95 | .95 |
| pitch angle | 0.3° | 0.3° |
| Outer conductor | Aluminum (both bands) | |
| Bend (see FIG. 7) | | |
| minimum bend radius $R_o$ | 2.46 ft | 0.82 ft |
| maximum curvature $k_o$ | .4065 ft$^{-1}$ | .219 ft$^{-1}$ |
| length $L = 2Z_1$ | 7.728 ft | 2.6 ft |
| $0_o$ | 90° | 90° |
| curvature slope m | .1052 | .9377 |

For such waveguide, at S band, the calculated predicted performance for the bend configuration shown in FIG. 7 indicates a total bend loss of approximately 0.013 dB; whereas, for a 150 foot waveguide system including a straight section and a 90° bend, the total loss was calculated to be about 0.15 dB. This compares to standard rectangular waveguide loss of over 1 dB. This total loss corresponds to an average 10's of watts per foot dissipation at 100's of kW average power if all attenuation is converted to heat and heat loss increases by less than 60% in the bend. From preliminary analysis, air cooling of the waveguide system should be sufficient even at these extreme power levels.

From the foregoing discussion it should be readily apparent that the waveguide design attained in accordance with the present invention exhibits the desired low attenuation, both in a compact bend and over the total guide length. It has been determined that similar calculated performance is achieved for a variety of helix design parameter combinations. Note also that at 8 cm. guide radius, propagation of $TE_{0n}$ modes (n=1) and the $TE_{21}$ mode are in cutoff. As the waveguide helix structure does not suppress circular TE modes above their cutoff frequencies, this is a desirable attribute. Similarly, although indirect mode coupling to the $TE_{21}$ mode is not expected for these configurations, this mode does not even exist is this case.

As will be appreciated by one skilled in the art of waveguide design, conditions found to be optimal or incompatible with good design practice, from the parametric study of over 2000 waveguide design parameter value combinations, were incorporated into the CAD programs proposed in accordance with the present invention. The result is the attainment of the following features:

a) bends optimized for both low loss and minimum sizes as a function of operating frequency;

b) warning condition for waveguide diameter allowing other circular ($TE_{0m}$, $m>1$) modes to propagate;

c) prevention from further design calculation if the desired $TE_{01}$ mode has higher loss than certain undesired modes;

d) more exact calculation of bend loss integrals with validity checks; and e) total loss for selected runs of straight and bend waveguide sections.

It will be readily understood by those of ordinary skill in the waveguide field that various modifications, alterations and embodiments are suggested and/or contemplated within the scope of the foregoing disclosure, and therefore it should be understood that within the scope of the appended claims, the invention may be practiced otherwise than as specifically described hereinabove.

What we claim is:

1. A computer aided method for designing a circular overmoded waveguide of the dielectric lined type, comprising the steps of programming said computer to receive selected input waveguide design parameters and to characterize and predict operational waveguide system performance based thereupon, said input design parameters including:

selected waveguide operating frequency,
selected waveguide dimensions, including
 a) waveguide inner diameter within the range 1.75 to 2.0 wavelengths for operating frequency up to approximately the low millimeter band (30 GHz), and
 b) dielectric lining thickness approximately 7.5% of waveguide inner diameter,
selected waveguide system configurations, including the length of straight waveguide and the number of waveguide bends,
characteristics of selected waveguide material, including
 c) real part of lining dielectric constant within the range 4 to 6, and
 d) imaginary part of lining dielectric constant within the range $-0.0005$ to $-0.005$, and said steps of programming said computer includes programming said computer to perform the following operations:

(A) calculate operational losses for each selected waveguide system configuration based upon said selected input waveguide design parameters for the total waveguide length and number of bends in said configuration, and whereby an optimal waveguide system configuration is indicated, and (B) generate an optimized waveguide design based upon the results of the preceding step.

2. The computer aided design method specified in claim 1, further including the steps of programming said computer to perform the following additional operations:

(A) providing a warning if calculations of operational performance indicate a potentially inoperable waveguide system based upon input design parameters selected, (B) provide default values for waveguide diameter and bend curvature and bend length, and (C) provide diagnostics to indicate if any assumptions or approximation validity is exceeded.

3. The computer aided design method specified in claim 1 wherein said computer is programmed to determine, for each set of selected input design parameters, the complex eigenvalues ($k_n$'s) for the characteristic equation $$\left[ \frac{J_p'(k_n)}{J_p(k_n)} - \left(\frac{k_n}{k_n^e}\right) \frac{H_p^{(2)'}(k_n^e) - c'H_p^{(1)'}(k_n^e)}{H_p^{(2)}(k_n^e) - c'H_p^{(1)}(k_n^e)} \right].$$

$$\left[ \frac{J_p'(k_n)}{J_p(k_n)} - \left(\epsilon_{re}\frac{k_n}{k_n^e}\right) \frac{H_p^{(2)'}(k_n^e) - cH_p^{(1)'}(k_n^e)}{H_p^{(2)}(k_n^e) - cH_p^{(1)}(k_n^e)} \right] =$$

$$p^2(\epsilon_{re} - 1)^2 \frac{h_n^2 a^4 k^2}{k_n^2 (k_n^e)^4}$$

and said computer being further programmed to compute the bend loss, straight guide losses, and total losses for a selected system configuration of lined dielectric waveguide, thereby indicating the operability of said selected system configuration.

4. The computer aided design method specified in claim 3 wherein said computer is programmed with a main program to compute the complex eigenvalues for the selected input lining dielectric constant parameter and having starting eigenvalues for a perfectly conducting plain circular waveguide, and with a first subroutine program to compute real eigenvalues for selected lining dielectric constants, a second subroutine program responsive to the real eigenvalues computed by said first subroutine program for computing additional starting eigenvalues for said main program, a third subroutine program having input parameters characterizing selected waveguide bend and straight waveguide configurations for computing operating power losses within said selected waveguide bend and straight configurations, and a fourth subroutine program for summarizing and outputting the computations performed by said main and said first, second and third subroutine programs.

5. A computer aided method for designing a circular overmoded waveguide of the dielectric sheathed helix type, comprising the steps of programming said computer to receive selected input waveguide design parameters and to characterize and predict operational waveguide system performance based thereupon, said input design parameters including:

selected waveguide operating frequency,
selected waveguide dimensions, including
 a) helix diameter within the range 1.75 to 2.0 wavelengths for operating frequency up to approximately the low millimeter band (30 GHz),
 b) dielectric sheath thickness within the range 7.5 to 10% of waveguide inner diameter,
selected waveguide system configurations, including the length of straight waveguide and the number of waveguide bends, characteristics of selected waveguide material, including
- c) real part of sheath dielectric constant within the range 2 to 11, and
- d) imaginary part of sheath dielectric constant within the range −0.001 to −0.1, and said steps of programming said computer includes programming said computer to perform the following operations:
- (A) calculate operational losses for each selected waveguide system configuration based upon said selected input waveguide design parameters for the total waveguide length and number of bends in said configuration, and whereby an optimal waveguide system configuration is indicated, and
- (B) generate an optimized waveguide design based upon the results of the preceding step.

6. The computer aided design method as specified in claim 5 wherein said selected input design parameters further include helix wire diameter, helix insulation characteristics and helix pitch.

7. The computer aided design method specified in claim 5 wherein:
- a) real part of the sheath dielectric constant is within the range 6 to 11, and
- b) imaginary part of the sheath dielectric constant is within the range −0.005 to −0.05.

8. The computer aided design method specified in claim 5, further including the steps of programming said computer to perform the following additional operations:
- (A) providing a warning if calculations of operational performance indicate a potentially inoperable waveguide system based upon input design parameters selected,
- (B) provide default values for waveguide diameter and bend curvature and bend length, and
- (C) provide diagnostics to indicate if any assumptions or approximation validity is exceeded.

9. The computer aided design method specified in claim 5 wherein said computer is programmed to determine, for each set of selected input design parameters, the complex eigenvalues ($k_n$'s) for the characteristic equation $$\frac{J_p'(k_n)}{J_p(k_n)} - \left(\frac{ph_n}{kk_n}\right)^2 \frac{J_p(k_n)}{J_p'(k_n)} =$$

$$\frac{\epsilon_{re} k_n}{k_n^e} \left[ \frac{H_p^{(2)'}(k_n^e) - cH_p^{(1)'}(k_n^e)}{H_p^{(2)}(k_n^e) - cH_p^{(1)}(k_n^e)} - \right.$$

$$\left. \frac{1}{\epsilon_{re}} \left(\frac{ph_n}{k_n^e k}\right)^2 \frac{H_p^{(2)}(k_n^e) - c'H_p^{(1)}(k_n^e)}{H_p^{(2)'}(k_n^e) - c'H_p^{(1)'}(k_n^e)} \right]$$

and said computer being further programmed to compute the bend loss, straight guide losses, and total losses for a selected system configuration of sheathed-helix waveguide, thereby indicating the operability of said selected system configuration.

10. The computer aided design method specified in claim 9, wherein said computer is programmed with
- a main program to compute the complex eigenvalues for the selected input sheath dielectric constant parameter and having starting eigenvalues for a perfectly conducting plain circular waveguide, and with
- a first subroutine program to compute additional starting eigenvalues for said main program from selected sheath dielectric constants,
- a second subroutine program having input parameters characterizing a selected helix of insulated wire to compute straight waveguide operating power loss as a function of helix pitch angle and helix wire-to-insulation coating diameter ratio,
- a third subroutine program having input parameters characterizing a selected waveguide bend configuration to compute operating power losses within said bend configuration, and
- a fourth subroutine program for summarizing and outputting the computations performed by said main program and said first, second and third subroutine programs.

* * * * *